(12) United States Patent
Jajuee et al.

(10) Patent No.: US 9,550,190 B2
(45) Date of Patent: Jan. 24, 2017

(54) DEWATERING OIL SAND TAILINGS

(71) Applicants: Babak A. Jajuee, Sarnia (CA); Randall S Lachine, Brights Grove (CA); Joseph L. Feimer, Brights Grove (CA); Aaron Ortiz-Gomez, Sarnia (CA); Frederick Vandervaart, Sarnia (CA)

(72) Inventors: Babak A. Jajuee, Sarnia (CA); Randall S Lachine, Brights Grove (CA); Joseph L. Feimer, Brights Grove (CA); Aaron Ortiz-Gomez, Sarnia (CA); Frederick Vandervaart, Sarnia (CA)

(73) Assignee: ExxonMobil Upstream Research Company, Spring, TX (US)

( * ) Notice: Subject to any disclaimer, the term of this patent is extended or adjusted under 35 U.S.C. 154(b) by 641 days.

(21) Appl. No.: 13/670,317

(22) Filed: Nov. 6, 2012

(65) Prior Publication Data

US 2013/0112561 A1     May 9, 2013

(30) Foreign Application Priority Data

Nov. 8, 2011   (CA) .................................... 2757955
Jul. 24, 2012   (CA) .................................... 2783819

(51) Int. Cl.
    *B03C 5/00*     (2006.01)
    *B03C 5/02*     (2006.01)
    (Continued)

(52) U.S. Cl.
    CPC . *B03C 5/00* (2013.01); *B03C 5/02* (2013.01); *C02F 11/006* (2013.01); *C02F 11/12* (2013.01); *C02F 1/4698* (2013.01)

(58) Field of Classification Search
    CPC ...... B01D 61/56; C02F 1/4696; C02F 1/4698; C02F 11/006; C02G 1/047
    (Continued)

(56) References Cited

U.S. PATENT DOCUMENTS 3,506,066 A  *  4/1970  Nonnenmacher ................ 165/87
3,613,564 A  *  10/1971  Adamski ............ B01D 33/0064
                                                            100/112
(Continued)

FOREIGN PATENT DOCUMENTS

CA          1027501         3/1978       .................. 196/24
CA          2075108         1/1994       .............. C10G 1/04
(Continued)

OTHER PUBLICATIONS

Spinosa et al, A Simple Method for Evaluating Sludge Yield Stress, Advances in Environmental Research 7 (2003), 655-659.*
(Continued)

*Primary Examiner* — Keith Hendricks
*Assistant Examiner* — Salil Jain
(74) *Attorney, Agent, or Firm* — ExxonMobil Upstream Research Company Law Dept.

(57) ABSTRACT

Described herein, is a method of dewatering a slurry, the slurry being tailings from bitumen extraction of mined oil sand. The slurry is passed through at least one electro-kinetic thickener having a voltage gradient to separate water from the slurry to produce a dewatered slurry. The electro-kinetic thickener may comprise an auger to move the slurry downstream. The auger has a conductive component in the form of a wire, ribbon or rod as an anode (positive electrode) to attract negatively-charged slurry particles and to repel the positively-charged cations and associated water. The auger is shafted or shaftless. The electro-kinetic thickener may also comprise a porous drum having the auger disposed therein. The porous drum is a cathode (negative electrode) to repel the negatively-charged slurry particles, attract the positively-charged cations and associated water, and allow the water to pass through the porous drum.

14 Claims, 9 Drawing Sheets

(51) Int. Cl.
  *C02F 11/00* (2006.01)
  *C02F 11/12* (2006.01)
  *C02F 1/469* (2006.01)

(58) Field of Classification Search
  USPC .................................. 204/553, 648, 649
  See application file for complete search history.

(56) References Cited

U.S. PATENT DOCUMENTS

| | | | |
|---|---|---|---|
| 3,684,699 A | 8/1972 | Vermeulen et al. | 208/188 |
| 3,898,058 A | 8/1975 | McGill | 55/50 |
| 4,116,275 A | 9/1978 | Butler et al. | 166/303 |
| 4,132,641 A * | 1/1979 | Elsworth | 210/808 |
| 4,240,897 A | 12/1980 | Clarke | 208/11 LE |
| 4,280,559 A | 7/1981 | Best | 166/303 |
| 4,343,691 A | 8/1982 | Minkkinen | 208/11 LE |
| 4,344,485 A | 8/1982 | Butler | 166/271 |
| 4,430,861 A | 2/1984 | Avery | 60/675 |
| 4,499,949 A | 2/1985 | Audeh | 166/269 |
| 4,501,648 A * | 2/1985 | Ritter | 204/514 |
| 4,529,497 A | 7/1985 | Watson et al. | 208/11 R |
| 4,561,965 A | 12/1985 | Minkkinen | 208/11 LE |
| 4,608,126 A | 8/1986 | Watson | 202/84 |
| 4,676,889 A | 6/1987 | Hsieh et al. | 208/390 |
| 4,804,459 A | 2/1989 | Bartholic et al. | 208/253 |
| 4,818,373 A | 4/1989 | Bartholic et al. | 208/252 |
| 4,867,755 A | 9/1989 | Majid et al. | 44/604 |
| 4,875,998 A | 10/1989 | Rendall | 208/390 |
| 5,236,577 A | 8/1993 | Tipman et al. | 208/390 |
| 5,262,013 A | 11/1993 | Beal et al. | 203/18 |
| 5,320,746 A | 6/1994 | Green et al. | 208/391 |
| 5,415,673 A | 5/1995 | Hilton et al. | 48/197 R |
| 5,539,140 A | 7/1996 | Davidovits | 588/3 |
| 5,551,640 A * | 9/1996 | Rajchel | 241/21 |
| 5,555,838 A | 9/1996 | Bergman | 114/265 |
| 5,582,691 A | 12/1996 | Flynn et al. | 203/11 |
| 5,674,315 A | 10/1997 | Bareuther et al. | 106/486 |
| 5,792,251 A | 8/1998 | Smiley et al. | 106/484 |
| 5,846,314 A | 12/1998 | Golley | 106/705 |
| 5,876,592 A | 3/1999 | Tipman et al. | 208/390 |
| 5,899,274 A | 5/1999 | Frauenfeld et al. | 166/401 |
| 5,925,291 A | 7/1999 | Bharathan et al. | 261/69.1 |
| 5,968,349 A | 10/1999 | Duyvesteyn et al. | 208/390 |
| 5,986,148 A | 11/1999 | Beech et al. | 568/694 |
| 6,004,069 A | 12/1999 | Sudbury | 405/129 |
| 6,007,709 A | 12/1999 | Duyvesteyn et al. | 208/391 |
| 6,036,748 A | 3/2000 | Wallace et al. | 95/257 |
| 6,042,718 A | 3/2000 | Bland et al. | 208/187 |
| 6,074,558 A | 6/2000 | Duyvesteyn et al. | 210/611 |
| 6,214,213 B1 | 4/2001 | Tipman et al. | 208/390 |
| 6,230,814 B1 | 5/2001 | Nasr et al. | 166/400 |
| 6,357,526 B1 | 3/2002 | Abdel-Halim et al. | 166/272.3 |
| 6,358,403 B1 | 3/2002 | Brown et al. | 208/390 |
| 6,358,404 B1 | 3/2002 | Brown et al. | 208/390 |
| 6,365,038 B1 | 4/2002 | Doron | 208/434 |
| 6,662,872 B2 | 12/2003 | Gutek et al. | 166/272.4 |
| 6,708,759 B2 | 3/2004 | Leaute et al. | 166/272.4 |
| 6,712,215 B2 | 3/2004 | Scheybeler | 209/135 |
| 6,769,486 B2 | 8/2004 | Lim et al. | 166/263 |
| 6,800,116 B2 | 10/2004 | Stevens et al. | 95/262 |
| 6,894,292 B2 | 5/2005 | Gil et al. | 250/492.2 |
| 6,988,549 B1 | 1/2006 | Babcock | 166/267 |
| 7,067,811 B2 | 6/2006 | Long et al. | 250/339.12 |
| 7,141,162 B2 | 11/2006 | Garner et al. | 210/202 |
| 7,261,810 B2 | 8/2007 | Argo et al. | 208/370 |
| 7,282,136 B2 | 10/2007 | Howdeshell | 208/48 AA |
| 7,556,715 B2 | 7/2009 | Gaston et al. | 196/14.52 |
| 7,562,706 B2 | 7/2009 | Li et al. | 166/245 |
| 7,867,384 B2 | 1/2011 | Coveley | |
| 8,110,095 B2 | 2/2012 | Strand | |
| 8,226,820 B1 | 7/2012 | Wegner | |
| 2002/0006969 A1 | 1/2002 | O'Beck et al. | 518/704 |
| 2003/0127400 A1 | 7/2003 | Kresnyak et al. | 210/767 |
| 2003/0221992 A1 | 12/2003 | Gorbaty et al. | 208/126 |
| 2005/0150844 A1 | 7/2005 | Hyndman et al. | 210/750 |
| 2006/0027488 A1 | 2/2006 | Gauthier | 208/309 |
| 2006/0048920 A1 | 3/2006 | Helleur | 165/108 |
| 2006/0113218 A1 | 6/2006 | Hart et al. | 208/391 |
| 2006/0138055 A1 | 6/2006 | Garner et al. | 210/703 |
| 2006/0196812 A1 | 9/2006 | Beetge et al. | 208/435 |
| 2006/0260980 A1 | 11/2006 | Yeung | 208/39 |
| 2007/0051682 A1 * | 3/2007 | Jones et al. | 210/650 |
| 2007/0111903 A1 | 5/2007 | Engel et al. | 507/261 |
| 2007/0131427 A1 | 6/2007 | Li et al. | 166/302 |
| 2007/0267355 A1 | 11/2007 | Jones et al. | |
| 2007/0272596 A1 | 11/2007 | Erasmus et al. | 208/400 |
| 2008/0135241 A1 | 6/2008 | Iqbal et al. | 166/266 |
| 2009/0321323 A1 * | 12/2009 | Sharma et al. | 208/390 |
| 2010/0258478 A1 | 10/2010 | Moran et al. | |
| 2012/0175315 A1 * | 7/2012 | Revington et al. | 210/732 |
| 2012/0241390 A1 | 9/2012 | Hassan et al. | |
| 2012/0255872 A1 | 10/2012 | Smith et al. | |
| 2012/0292186 A1 | 11/2012 | Adamson | |
| 2013/0001136 A1 | 1/2013 | Adeyinka et al. | |
| 2013/0056395 A1 | 3/2013 | Pierre, Jr. et al. | |
| 2013/0098765 A1 * | 4/2013 | Stradi et al. | 204/518 |

FOREIGN PATENT DOCUMENTS

| | | | |
|---|---|---|---|
| CA | 2149737 | 11/1996 | B03B 9/02 |
| CA | 2200899 | 9/1998 | B03B 9/02 |
| CA | 2232929 | 9/1998 | B03B 9/02 |
| CA | 2217300 | 8/2002 | C08L 95/00 |
| CA | 2353109 | 1/2003 | B03B 9/02 |
| CA | 2425840 | 10/2004 | B01D 19/02 |
| CA | 2493677 | 6/2005 | B03B 9/02 |
| CA | 2435113 | 11/2005 | C10G 33/04 |
| CA | 2520943 | 4/2006 | C10G 1/04 |
| CA | 2490734 | 6/2006 | B08B 9/08 |
| CA | 2502329 | 9/2006 | B03B 9/02 |
| CA | 2547147 | 11/2006 | C10C 3/02 |
| CA | 2521248 | 3/2007 | B03B 9/02 |
| CA | 2587166 | 9/2007 | C10C 3/00 |
| CA | 2613873 | 9/2007 | C10C 3/00 |
| CA | 2614669 | 9/2007 | C10C 3/02 |
| CA | 2550623 | 12/2007 | B03B 9/02 |
| CA | 2592725 | 1/2008 | B08B 9/09 |
| CA | 2595336 | 1/2008 | C10G 75/04 |
| CA | 2689469 | 6/2011 | C10G 1/04 |
| CA | 2724806 | 6/2011 | C10G 1/04 |
| CA | 2741020 | 10/2011 | |
| CA | 2736675 | 10/2012 | |
| CA | 2758872 | 10/2012 | |
| CA | 2757955 | 5/2013 | |
| EP | 0286714 | 4/1987 | |
| JP | 2004-190417 | 7/2004 | B01D 35/06 |
| JP | 2004190417 | 7/2004 | |
| WO | WO 2004-060812 | 7/2004 | C02F 1/08 |
| WO | WO 2007-102819 | 9/2007 | B03D 1/14 |
| WO | WO 2013/016821 | 2/2013 | |

OTHER PUBLICATIONS

Bagnoli, E. et al. (1984) "Psychrometry, Evaporative Cooling, Refrigeration, and Cryogenic Processes," *Perry's Chemical Engineers' Handbook*, 6th Edition, Section 12, pp. 30-39, ISBN 0-07-049479-7.

Darling, Scott (2007) "CFB Technology: Clean, Economic and Efficient Steam and Power Generation for the Oil Sands Industry," Part 1, *Alstom*, 9 pgs.

Darling, Scott (2007) "CFB Technology: Clean, Economic and Efficient Steam and Power Generation for the Oil Sands Industry," Part 2, *Alstom*, 14 pgs.

Darling, Scott (2007) "CFB Technology: Clean, Economic and Efficient Steam and Power Generation for the Oil Sands Industry," Part 3, *Alstom*, 12 pgs.

de Spot, M. et al. (2003) "Metakaolin Study: Pre-Feasibility Review of the Potential for Developing Metakaolin from Oil Sands Operations for Use in Concrete," *Ecosmart™ Concrete Project*, 23 pages.

Duxson, P. (2006) "The Structure and Thermal Evolution of Metakaolin Geopolymers," *Thesis, The University of Melbourne*, Part 1, 98 pages.

(56) References Cited

OTHER PUBLICATIONS

Duxson, P. (2006) "The Structure and Thermal Evolution of Metakaolin Geopolymers," *Thesis, The University of Melbourne*, Part 2, 97 pages.

Duxson, P. (2006) "The Structure and Thermal Evolution of Metakaolin Geopolymers," *Thesis, The University of Melbourne*, Part 3, 97 pages.

Duxson, P. (2006) "The Structure and Thermal Evolution of Metakaolin Geopolymers," *Thesis, The University of Melbourne*, Part 4, 98 pages.

Friehmelt, V. et al. (2006) "Electrokinetic Dewatering Process for Industrial Sludge," 8 pages.

Kaminsky, H. A. W. et al. (2008) "Characterization of Heavy Minerals in the Athabasca Oil Sands," *Minerals Engineering*, v. 21, pp. 264-271.

Kantardjieff, A. et al. (1997) "Improved Dewatering of Pulp and Paper Mill Sludges," *TAPPI Proceedings, Environmental Conference & Exhibit*, pp. 723-727.

Mahmoud, A. et al. (2010) "Electrical Field: A Historical Review of its Application and Contributions in Wastewater Sludge Dewatering," *Water Research*, v.44, pp. 2381-2407.

Shell Canada Ltd. (2007) Ore Processing: Application for Approval of the Jackpine Mine Expansion Project vol. 1, Sections 6.1-6.3, 20 pages.

SNC-Lavalin (2004) "Synergies Between SAGD and Mining Facilities for the Recovery of Heavy Oil," *ICE2004-CWLS Joint Conference*, 25 pages.

Suzuki, Y. et al. (1990) "Development of Continuous Dehydrator for Fish Meat by Electroosmotic Method," *Miyagi Prefectural Institute of Technology*, Abstract, 1 page.

Vega, L. A. (1999) "Ocean Thermal Energy Conversion (OTEC)," 23 pages, www.otecnews.org/articles/vega/OTECbyVega_with_photos.pdf.

Website (2006) "Pictures of the Future Spring 2006, Infrastructures-Power Plants," *Siemens AG Online Publication*, 3 pages.

Website (2008) "Screw Press Introduction," *FKC Screw Press*, 2 pages.

Wong, R. C. K. et al. (2004) "Calcined Oil Sands Fine Tailings as a Supplementary Cementing Material for Concrete," *Cement and Concrete Research*, v. 34, pp. 1235-1242.

Friehmelt, V. & Gidarakos, E., "Electrokinetic Dewatering Process for Industrial Sludge".

Kantardjieff, A., et al., (1977) "Improved Dewatering of Pulp and Paper Mill Sludges", 1977 Environmental Conference & Exhibit, 723-727.

Mahmoud, A., et al., (2010) "Electrical field: A historical review of its application and contributions in wastewater sludge dewatering" Water Research 44, 2381-2407.

Suzuki, Y., Konno, M., Sato, Y, and Shishido, I. (1990) "Development of continuous dehydrator for fish meat by electrosmotic method". Kagaku Kogaku Ronbunshi. 16(6), 1133-1137.

\* cited by examiner

DEWATERING OIL SAND TAILINGS

CROSS-REFERENCE TO RELATED APPLICATIONS

This application claims priority from Canadian Patent Application No. 2,757,955 filed Nov. 8, 2011 entitled DEWATERING SLURRIES, and Canadian Patent Application 2,783,819 filed Jul. 24, 2012 entitled DEWATERING OIL SAND TAILINGS, the entirety of which are incorporated by reference herein.

FIELD

The present disclosure is in the field of dewatering slurries, for instance oil sand tailings.

BACKGROUND

Oil sand extraction processes are used to liberate and separate bitumen from oil sands so that the bitumen can be further processed to produce synthetic crude oil. Numerous oil sand extraction processes have been developed and commercialized, many of which involve the use of water as a processing medium. Other processes are non-aqueous solvent-based processes. An example of a solvent-based process is described in Canadian Patent Application No. 2,724,806 (Adeyinka et al, published Jun. 30, 2011 and entitled "Process and Systems for Solvent Extraction of Bitumen from Oil Sands). Solvent may be used in both aqueous and non-aqueous processes.

One water-based extraction process is the Clark hot water extraction process (the "Clark Process"). This process typically requires that mined oil sands be conditioned for extraction by being crushed to a desired lump size and then combined with hot (e.g. 95° C.) water and perhaps other agents to form a conditioned slurry of water and crushed oil sands. In the Clark Process, an amount of sodium hydroxide (caustic) may be added to the slurry to increase the slurry pH, which enhances the liberation and separation of bitumen from the oil sands. Other water-based extraction processes may use other temperatures and may include other conditioning agents, which are added to the oil sand slurry, or may operate without conditioning agents. This slurry is first processed in a Primary Separation Cell (PSC), also known as a Primary Separation Vessel (PSV), to extract the bitumen from the slurry.

An overall bitumen extraction process is depicted in FIG. 1. The water and oil sands slurry 100 is separated into three major streams in the PSC 101: bitumen froth 102, middlings 104 and PSC underflow 106. Further processing of each of these streams is explained below. Also shown in FIG. 1, is the solvent 108 added for froth treatment 110, bitumen 112, TSRU (tailings solvent recovery unit) tailings 114, flotation cells 116, recycle bitumen froth 118, fine flotation tailings (FFT) 120, and an external tailings area (ETA) or tailings ponds 122.

Regardless of the type of water-based extraction process employed, the process will typically result in the production of a bitumen froth 102 that requires treatment with a solvent. For example, in the Clark Process, a bitumen froth stream comprises bitumen, fine particulate solids (also referred to as mineral or inorganic solids) and water. Certain processes use naphtha to dilute bitumen froth before separating the product bitumen by centrifugation. These processes are called naphtha froth treatment (NFT) processes. Other processes use a paraffinic solvent, and are called paraffinic froth treatment (PFT) processes, to produce pipelineable bitumen with low levels of solids and water. In the PFT process, a paraffinic solvent (for example, a mixture of iso-pentane and n-pentane) is used to dilute the froth before separating the product, diluted bitumen, by gravity. A portion of the asphaltenes in the bitumen is also rejected by design in the PFT process and this rejection is used to achieve reduced solids and water levels. In both the NFT and the PFT processes, the diluted tailings (comprising water, solids and some hydrocarbon) are separated from the diluted product bitumen.

Solvent is typically recovered from the diluted product bitumen component before the bitumen is delivered to a refining facility for further processing.

One PFT process will now be described further, although variations of the process exist. The PFT process may comprise at least three units: Froth Separation Unit (FSU), Solvent Recovery Unit (SRU) and Tailings Solvent Recovery Unit (TSRU). Two FSUs may be used, as shown in FIG. 2.

With reference to FIG. 2, mixing of solvent with the feed bitumen froth 200 is carried out counter-currently in two stages: FSU-1 and FSU-2, labeled as Froth Separation Unit 1 202 and Froth Separation Unit 2 204. The bitumen froth comprises bitumen, water, and fine solids (also referred to as mineral solids). A typical composition of bitumen froth is about 60 wt % bitumen, 30 wt % water, and 10 wt % solids. The paraffinic solvent is used to dilute the froth before separating the product bitumen by gravity. Examples of paraffinic solvents are pentane or hexane, either used alone or mixed with isomers of pentanes or hexanes, respectively. An example of a paraffinic solvent is a mixture of iso-pentane and n-pentane. In FSU-1 202, the froth 200 is mixed with the solvent-rich oil stream 201 from the second stage (FSU-2) 204. The temperature of FSU-1 202 is maintained at, for instance, about 60° C. to about 80° C., or about 70° C., while the solvent to bitumen (SB) ratio may be from 1.4:1 to 2.2:1 by weight or may be controlled around 1.6:1 by weight for a 60:40 mixture of n-pentane: iso-pentane. The overhead from FSU-1 202 is the diluted bitumen product 205 (also referred to as the hydrocarbon leg) and the bottom stream from FSU-1 202 is the tailings 207 comprising water, solids (inorganics), asphaltenes, and some residual bitumen. The residual bitumen from this bottom stream is further extracted in FSU-2 204 by contacting it with fresh solvent 209, for instance, in a 25 to 30:1 (w/w) SB ratio at, for instance, about 80° C. to about 100° C., or about 90° C. Examples of operating pressures of FSU-1 and FSU-2 are about 550 kPag and 600 kPag, respectively. The solvent-rich oil (overhead) 201 from FSU-2 204 is mixed with the fresh froth feed 200 as mentioned above. The bottom stream from FSU-2 204 is the tailings 211 comprising solids, water, asphaltenes and residual solvent, which is to be recovered in the Tailings Solvent Recovery Unit (TSRU) 206 prior to the disposal of the tailings 213 in tailings ponds. The recovered solvent 218 from TSRU 206 is directed to the solvent storage 210. Solvent from the diluted bitumen overhead stream 205 is recovered in the Solvent Recovery Unit (SRU) 208 and passed as solvent 217 to Solvent Storage 210. Bitumen 215 exiting the SRU 208 is also illustrated. The foregoing is only an example of a PFT process and the values are provided by way of example only. An example of a PFT process is described in Canadian Patent No. 2,587,166 to Sury.

TSRU tailings stream 213 may comprise both coarse and fine solids and is sent for further treatment or disposed in an External Tailings Area (ETA). In general, coarse solids in TSRU tailings settle relatively rapidly while fine solids tend to remain in suspension. Fine solids concentrate to about 30 wt % solids in about two to three years but only very slowly thereafter, particularly in an ETA. This settled material is termed Mature Fine Tailings (MFT) and may also come from other bitumen processing, for instance naphthenic froth treatment.

As depicted in FIG. 1, from the PSC 101, the middlings stream 104, comprising bitumen and about 20-25% solids, is withdrawn and sent to the flotation cells 116 to further recover bitumen. The middlings 104, comprising bitumen, solids and water are processed by bubbling air through the slurry and creating a bitumen froth 118, which is recycled back to the PSC 101. The fine flotation tailings 120 from the flotation cells 116, comprising mostly solids and water, are sent for further treatment or disposed in an ETA.

As depicted in FIG. 1, the PSC underflow 106 from the PSC 101 is sent to an ETA or tailings pond 122. Tailings going into an ETA or tailings pond may include PSC underflow during regular operation and TSRU tailings and FFT during operation upsets. The PSC underflow 106 predominantly comprises coarse sands and has about 55% solids. Coarse solids settle rapidly while fine solids tend to remain in suspension. The fluid fine solids from all streams concentrate to about 30% mass solids in two to three years but only very slowly thereafter. This material, termed Mature Fine Tailings (MFT), is naturally generated over extended periods of time from streams disposed in an ETA.

It is desirable to dewater tailings (slurries) in order to (a) reuse the recovered water, (b) to have a smaller overall volume of slurry, and/or (c) to have a slurry with higher solids content that meets regulations criteria.

SUMMARY

Described herein is a method of dewatering a slurry, such as tailings generated during bitumen extraction of mined oil sand, for instance TSRU tailings, fluid fine tailings (FFT) or mature fine tailings (MFT).

The separation of water and solids is based on the application of a Voltage potential to a slurry that induces mobility of negatively-charged particles towards the anode by electro-phoresis and positively-charged ions and water towards the cathode by electro-osmosis and ion migration. The slurry is passed through at least one electro-kinetic thickener having a voltage gradient to separate water from the slurry to produce a dewatered slurry. The electro-kinetic thickener may comprise an auger to move the slurry downstream. An element of the auger may be of conductive material to function as a positive electrode (e.g. anode) to both attract negatively-charged slurry solid particles and to repel the positively-charged cations dissolved in water. The electro-kinetic thickener may also comprise a porous drum having the auger disposed therein. The porous drum is an electrode (e.g. cathode) to repel the negatively-charged slurry particles, attract the positively-charged cations and associated water, and allow the separated water to pass through the porous drum.

According to one aspect, there is provided a method of dewatering a slurry, the slurry being tailings from bitumen extraction of mined oil sands, the method comprising: passing the slurry comprising positively-charged and dissolved cations in water and negatively-charged and suspended particles through at least one electro-kinetic thickener having a voltage gradient to remove the positively-charged cations and associated water from the slurry to produce a dewatered slurry.

According to one aspect, there is provided an electro-kinetic thickener for dewatering a slurry, the slurry being tailings from bitumen extraction of mined oil sand, the electro-kinetic thickener comprising: an auger to move the slurry downstream, and having a conductive metal as an anode to attract negatively-charged slurry particles and to repel positively-charged water; and a porous drum, having the auger disposed therein, and being a cathode to repel the negatively-charged slurry particles, attract the positively-charged cations, and allow the positively-charged cations and associated water to pass through the porous drum by electro-osmosis.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DESCRIPTION OF EMBODIMENTS

Figure 1:
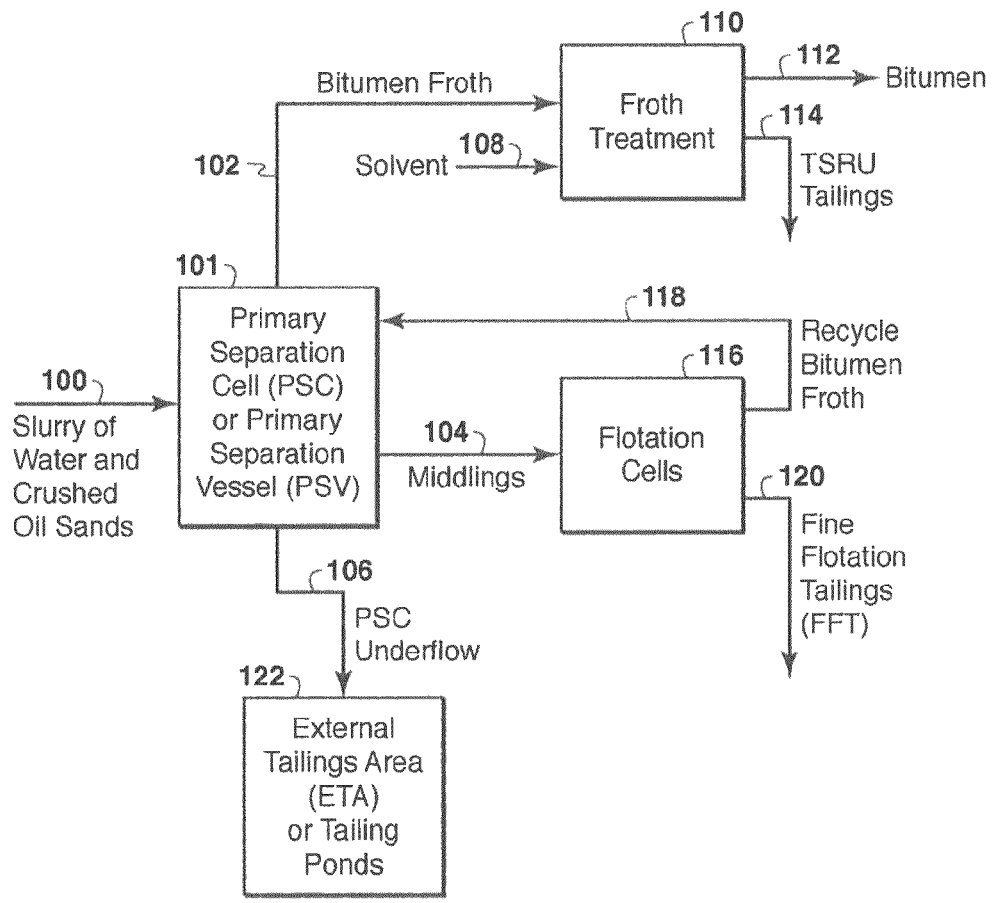
FIG. 1 is a flow diagram of an overall process for extraction of bitumen from oil sands.
Figure 2:
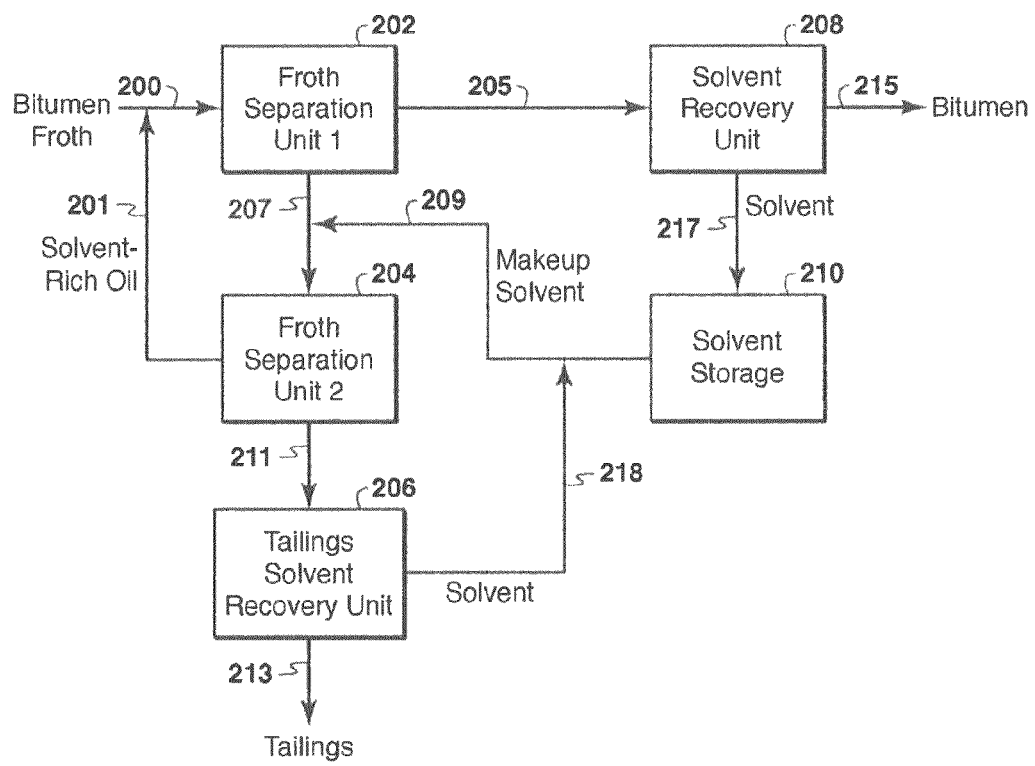
FIG. 2 is a flow diagram of a prior art paraffinic froth treatment process.
Figure 3:
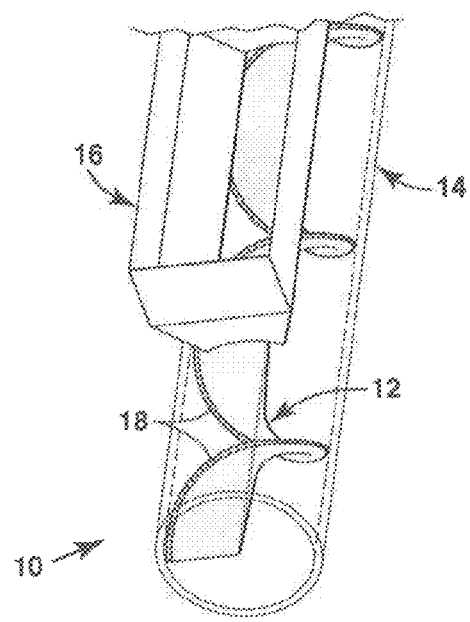
FIG. 3 is a schematic of an electro-kinetic thickener according to a disclosed embodiment.
Figure 4:
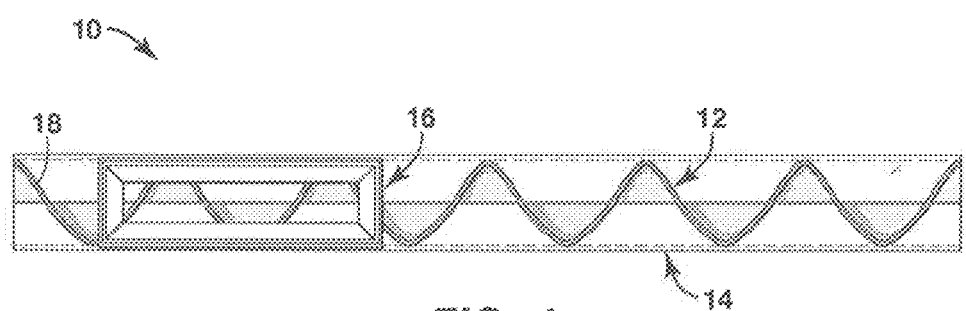
FIG. 4 is a schematic of an electro-kinetic thickener according to a disclosed embodiment.
Figure 5:
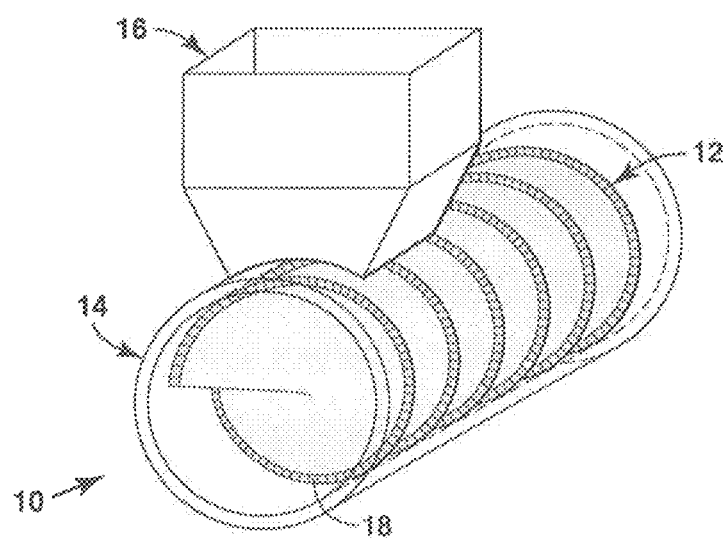
FIG. 5 is a schematic of an electro-kinetic thickener according to a disclosed embodiment.
Figure 6:
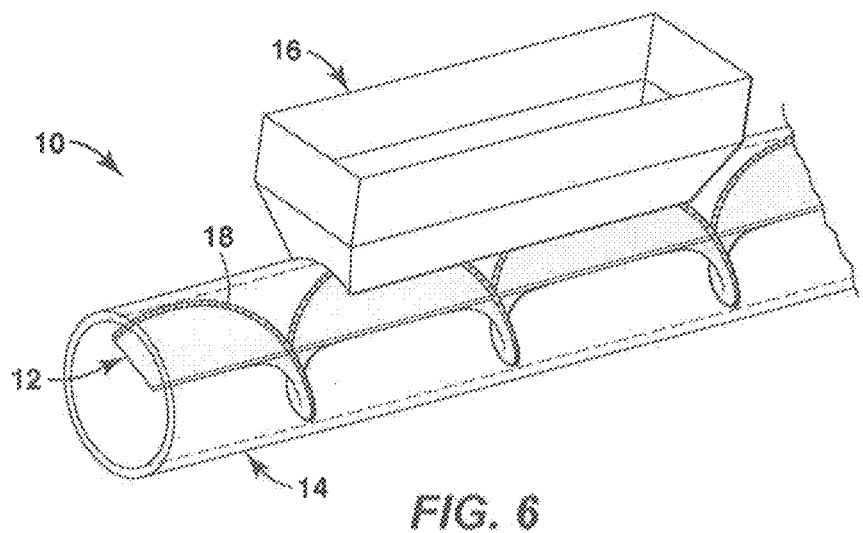
FIG. 6 is a schematic of an electro-kinetic thickener according to a disclosed embodiment.

Described herein is a method of dewatering a slurry, such as tailings generated during bitumen extraction of mined oil sand, for instance TSRU tailings, fluid fine tailings (FFT), or mature fine tailings (MFT).

The slurry is passed through at least one electro-kinetic thickener having a voltage gradient to separate water from the slurry to produce a dewatered slurry. The electro-kinetic thickener may comprise an auger to move the slurry downstream. An element of the auger may be of conductive material to function as an electrode (e.g. anode) to both attract negatively-charged slurry solid particles and to repel the positively-charged cations dissolved in water. The design, shape and material of the anode element in the auger may be determined by the specific properties of the solids in the tailings, which behave differently under an electro-kinetic process depending on the particle size distribution and composition. For slurries like TSRU tailings with Particle Size Distribution (PSD) of 1 micron to 300 microns and a $D_{50}$ of about 100 microns, the auger may be shafted and the anode element may be a conductive metal positioned around the non-conductive auger shaft in between non-conductive auger flights. In this design, solids will be sufficiently attracted to the anode element to induce dewatering and the swirling motion of the auger will convey the dewatered solids out of the system. For slurries like FFT whose PSD ranges from less than 1 micron to 120 microns and $D_{50}$ of about 70 microns and slurries like MFT whose PSD ranges from less than 1 micron to 30 microns and $D_{50}$ of about 7.5 microns, the non-conductive auger may be shaftless with an opening along the length of the auger and the anode element may be a conductive rod positioned in the center of the shaftless auger. Shaftless augers are also known as spiral augers. In this design, solids will be strongly attracted to the conductive rod and the rotating spiral auger will simultaneously scrape the solids off the auger while conveying them out of the system. The electro-kinetic thickener may also comprise a porous drum having the auger disposed therein. The porous drum is a negative electrode (e.g. cathode) to repel the negatively-charged slurry particles, attract the positively-charged cations and associated water, and allow the water to pass through the porous drum by electro-osmosis.

"Dewatering" means decreasing water content.

"Electro-kinetic" means the motion of particles and/or liquid under the influence of an applied D.C. electric field. In the present case, both particles and liquid are moving (in different directions) under the influence of an applied D.C. electric field.

While dewatering may be effected to a lesser extent, in one embodiment, the slurry may be dewatered to meet a specification of 5 kPa yield stress for the deposited material in a dedicated disposal area.

FIGS. 3 to 6 illustrate one design option, where the electro-kinetic thickener 10 comprises an auger 12 disposed within a porous drum 14. A feed hopper 16 may be used to feed the slurry (not shown) into the electro-kinetic thickener 10.

As it turns, the auger 12 moves the slurry downstream. A component of the auger 12 is an anode (positive electrode) and therefore attracts the negatively-charged slurry particles and repels the positively-charged cations and associated water. The auger 12 is disposed within the porous drum 14. This arrangement is distinguished from screw presses or other pressure dewatering techniques since electro-kinetic separation, and not pressure, is used for dewatering. In screw presses, slurries are dewatered forcing the water out of the particles by applying pressure. In the electro-kinetic thickener, the employed electrical field induces mobility of the negatively-charged solids towards the positive electrode (anode) and positively-charged cations and water towards the negative electrode (cathode).

The porous drum 14 is a cathode (negative electrode) and therefore repels the negatively-charged slurry particles and attracts the positively-charged cations and associated water. The porous drum 14 has pores that allow the water to pass through by electro-osmosis. "Electro-osmosis" means the movement of a liquid through a porous material under the influence of an electric field.

The water contained within the slurry, commonly with metal ions dissolved, carries a positive charge, leaving the slurry particles with a negative charge. As a result, water is continuously removed through the porous drum that carries the negative charge (cathode) while the gentle swirling motion of the anode auger pushes the slurry downstream.

The auger may be static or mobile. The helical blades of the auger may comprise a brush or any non-conductive coating medium (18 in FIGS. 3 to 6) extending close to or contacting the porous drum.

The porous drum may comprise a screen, (woven wire) mesh, sintered tube, or other material allowing a continuous hydraulic flow of positively-charged cations and associated water to occur.

Figure 11:
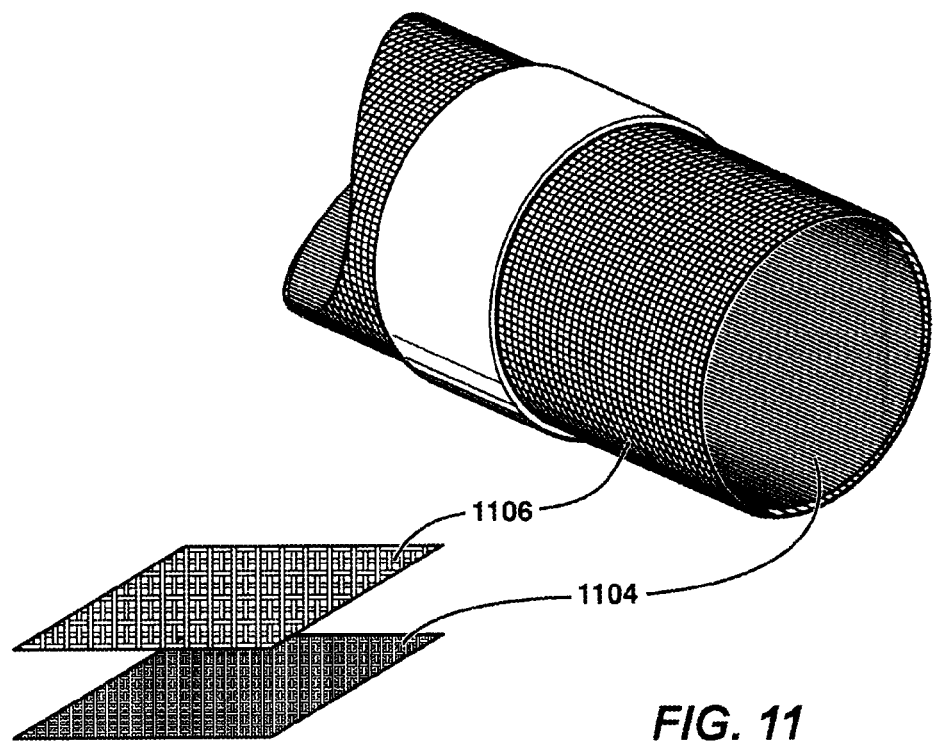
FIG. 11 is a schematic of a screen tube supported on its outside by a mesh tube according to a disclosed embodiment.

The porosity and thickness of the drum was found to be the rate-limiting step in the dewatering process. A screen tube supported on its outside by a mesh tube significantly improved dewatering performance and reduced fouling tendency in the cathode as compared to a sintered tube. The dewatering performance was 11.5 times faster as a result of replacing a sintered tube with a screen tube, as discussed further below and shown in FIG. 13. FIG. 11 is a schematic of a screen tube 1104 supported on its outside by a mesh tube 1106.

The screen tube is purposed to allow continuous hydraulic flow of positively-charged cations and associated water to occur by having appropriate pore size and appropriate pore number, based on the operating conditions, such as slurry composition and flow rate. The screen tube may, for instance, have a nominal pore size of between 10 to 40 µm. The screen tube may, for instance, be made of a metal or metal alloy. As discussed below, because of the operating environment, the material of the screen tube (or a coating thereon) may be selected for its corrosion resistance. If the screen tube is supported, for instance by one or two mesh tubes, it should be sufficiently sturdy to withstand the operating conditions. It is desirable to use a screen with minimum thickness and maximum strength. Keeping the screen relatively thin allows for higher dewatering rate and reduces fouling. The screen tube may be woven or non-woven.

Figure 12:
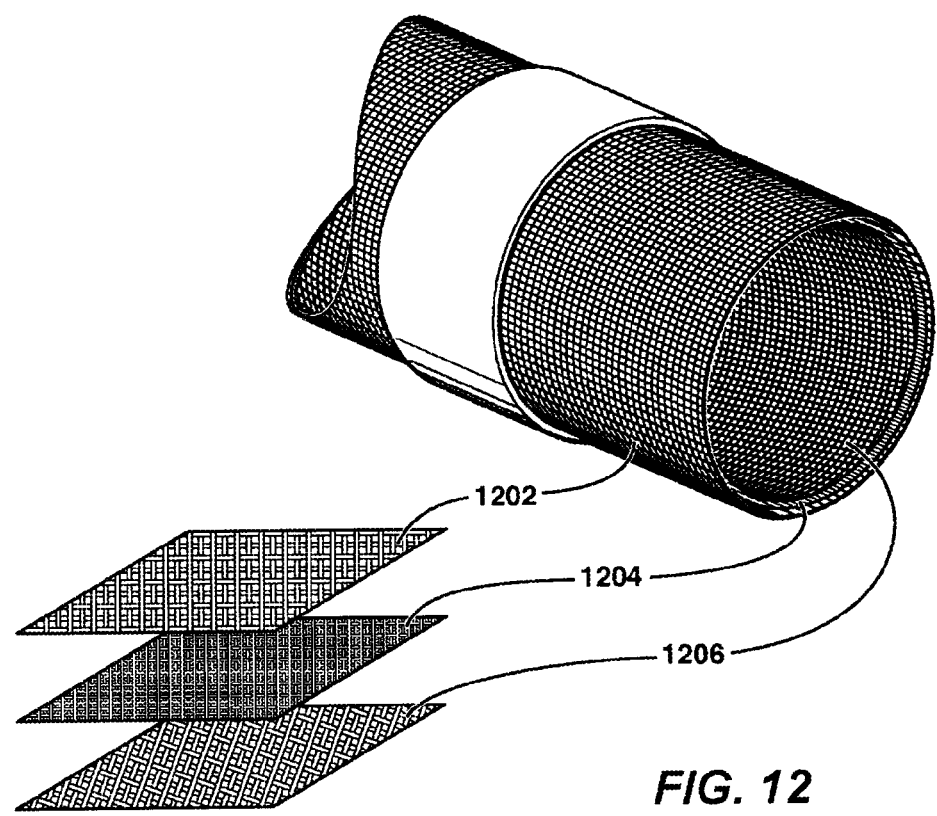
FIG. 12 is a schematic of a screen tube supported on its outside and on its inside by a mesh tube according to a disclosed embodiment.

As discussed above, the screen tube may be supported on its outside by a mesh tube. A screen exposed to the auger flights fouls eventually due to the pressing action of the flights which forces solids through the screen pores. An inside mesh tube may protect the screen from fouling over an extended period of time. FIG. 12 is a schematic of a screen tube 1204 supported on its outside and on its inside by two mesh tubes 1202 and 1206. The outside mesh tube provides sturdiness to the system while the inside mesh tube absorbs the pressure exerted by the auger flights and hence protects the screen from fouling. In this arrangement, the screen is sandwiched between the inside and the outside mesh tubes. The mesh tubes have holes which are larger than those of the screen. The mesh tube may, for instance, have a mesh number of 60 to 400, or apertures of 0.01 to 0.001 inches. As with the screen tube, because of the operating environment, the material of the mesh tube (or a coating thereon) may be selected for its corrosion resistance. The thickness of the mesh tube may be, for instance, in the range of 0.05 to 0.5 inches. The mesh tube may be woven or non-woven.

The term "tube" is intended to include less than a full 360°, particularly for the supportive mesh tubes. Perforated tubes and strainers can also be used as supportive tubes.

The screen pore size may be close to (for instance within 50% of) the D20 of the tailings particle size distribution, which is the size in microns that splits the distribution with 80% above and 20% below this diameter. Screens with larger pore sizes may directionally evince higher dewatering rates but may produce separated water with higher fines and hence lower quality for reuse. The pore size of the supportive tubes is not as important since the supportive tubes are merely to support the screen and protect it from fouling.

The electro-kinetic thickener may comprise a collection chamber for collecting the water passing through the porous drum.

A feed hopper may be used to feed the slurry into the electro-kinetic thickener. The slurry may be delivered by pipeline.

The voltage gradient of the electro-kinetic thickener may be from 2000 V/m to 6000 V/m. The voltage gradient is measured using the distance between the anode and the cathode. The voltage gradient may be supplied by an electrical field source, for instance a windmill or an electric generator.

The slurry may be tailings from bitumen extraction of mined oil sand, tailings solvent recovery unit (TSRU) tailings (from PFT or NFT), fine fluid tailings (FFT) from the flotation cells, and mature fine tailings (MFT), a stream from a solvent-based process, or any other kind of suspended solid particles in water slurry. An example of a solvent-based process is described in Canadian Patent Application No. 2,724,806 (Adeyinka et al., published Jun. 30, 2011, and entitled "Process and Systems for Solvent Extraction of Bitumen from Oil Sands).

MFT tailings, because of their high solid content (for instance about 30 wt % solids), are particularly well suited for this process. TSRU tailings (especially TSRU tailings from a PFT process) on the other hand may benefit from thickening prior to use in this process, for instance up to about 30-40 wt % solids. Thickening may be achieved through a conventional thickener with or without flocculation. The thickened tailings may also be passed through a shear-thinning loop using a centrifugal pump to dewater the thickened tailings through a pipeline, for use as the tailings feed for the electro-kinetic process. In the case of MFT, additional upstream thickening is not required since MFT is thickened naturally in tailing ponds over many years. The dredged MFT streams can be fed directly to the electro-kinetic thickener.

The tailings may comprise inorganic compounds and asphaltenes, such as where PFT-TSRU tailings are used. These inorganic compounds may comprise Si, Al, Ti, Ca, Fe, Mg, or more than one of the foregoing.

"Asphaltenes" means pentane insoluble, toluene soluble components of carbonaceous materials such as bitumen, crude oil, or coal. Generally, asphaltenes comprise carbon, hydrogen, nitrogen, oxygen, sulfur, vanadium and nickel. As mentioned above in the Background Section, a portion of the asphaltenes in bitumen is precipitated during bitumen-froth treatment using a paraffinic solvent.

Figure 7:
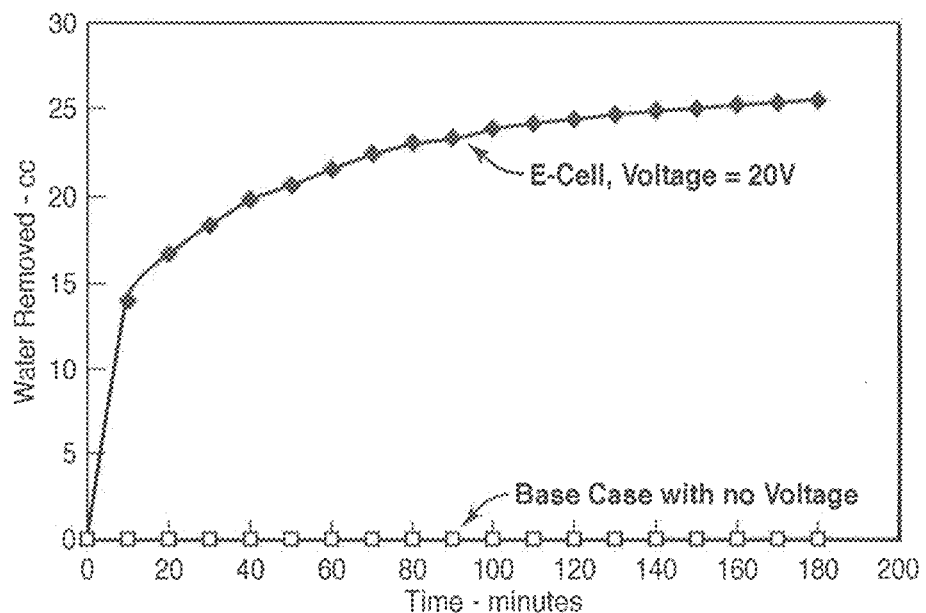
FIG. 7 is a graph showing the effectiveness of using an electro-kinetic cell in dewatering tailings.

FIG. 7 is a graph showing the effectiveness of using an electro-kinetic cell in dewatering tailings. In this example, a static cell was used with a voltage of 20V (Volts) over a thickness of 0.05 m (the thickness is the distance from the anode to the cathode). The voltage gradient was therefore 400 V/m. The MFT samples were 50 grams. The MFT samples were dewatered from 35% solids to more than 60% solids over the course of two hours. FIG. 7 shows the corresponding volume of water removed from the MFT sample. As shown, MFTs do not dewater on their own without the DC field. Electro-kinetic dewatering also significantly increased the dewatering rate of TSRU tailings. The x-axis is time in minutes. The y-axis is water removed in cubic centimeters (cc).

Figure 8:
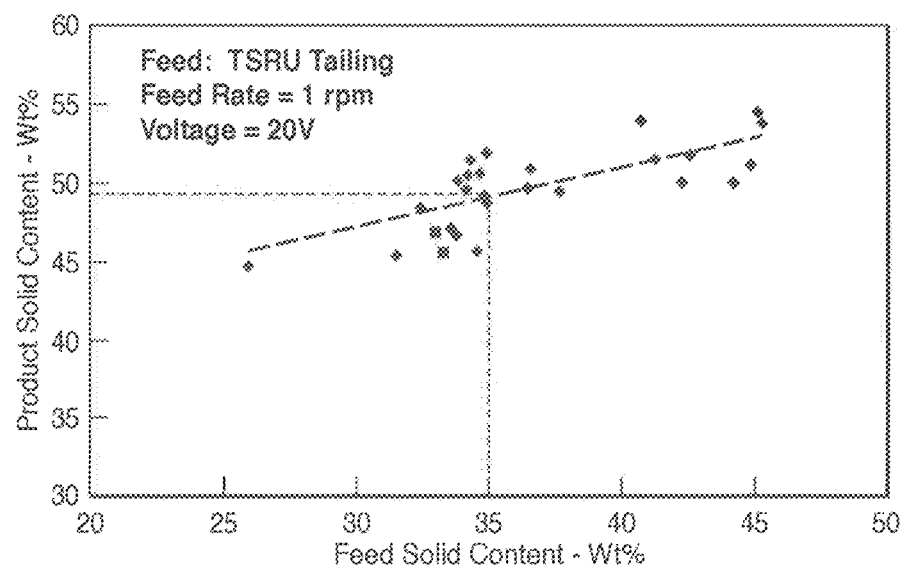
FIG. 8 is a graph showing the effectiveness of using an electro-kinetic thickener in dewatering TSRU tailings.

FIG. 8 is a graph showing the effectiveness of using an electro-kinetic thickener in dewatering TSRU tailings. In this example, a continuous electro-kinetic thickener was used with a voltage of 20V (Volts) over a thickness of 0.005 m. The voltage gradient was therefore 4000 V/m. As illustrated, the TSRU samples were dewatered from 35% solids to more than 50% solids continuously. The x-axis is feed solid content in weight percent (Wt %). The y-axis is product solid content in weight percent (Wt %).

Both MFT feed and dewatered MFT, after 2 hours at a voltage of 20V were subjected to a slump test. The MFT feed took the shape of the slump board, while the dewatered tailings held its shape indefinitely and had a yield stress of 5 KPa.

Possible advantages of embodiments described herein may include:
1. Higher dewatering rates as compared to a dewatering by settling or thin-lift drying.
2. Lower maintenance cost compared to centrifuges owing to the low-speed, high torque motor of the electro-kinetic thickener.
3. No flocculation/additives are required for this process. Non-flocculated tailings have generally higher water permeability, and hence dewater faster afterwards.
4. The ability to operate year-round in cold climates (such as in Northern Alberta), in a controlled process environment.
5. Lower energy and/or labor costs as compared to certain other dewatering processes.
6. Recoverable clean water for recycling with a pH of 11.
7. Good dewatering performance for fine particles. Finer particles provide higher charged surface area, promoting the dewatering process. This may remove, or mitigate, any need for consolidation of tailings technology that uses valuable but scarce coarse particles to force fine particles to settle.
8. Prevention (or mitigation) of plugging the porous drum (e.g. woven wire mesh) because the electrical voltage repels fine particles from the negatively-charged drum (cathode).

Figure 9:
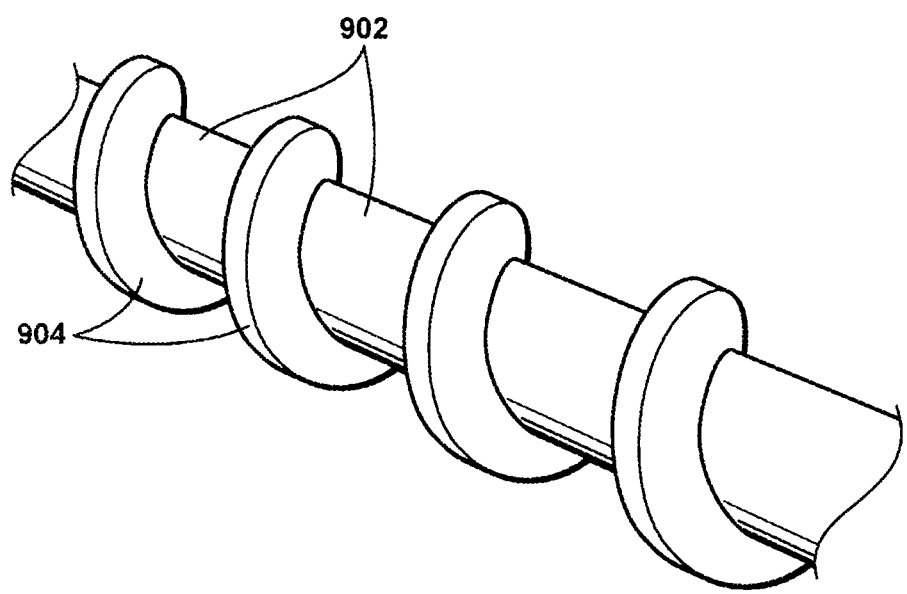
FIG. 9 is a schematic of an auger with conductive metal ribbon positioned around the shaft between the auger flights.

Auger and Anode Material and Design
Conductive Metal Around the Shaft of Shafted Auger For slurries like TSRU tailings with a Particle Size Distribution (PSD) of 1 micron to 300 microns and a $D_{50}$ of about 100 microns, the anode may be shafted and the anode element may be (with reference to FIG. 9) a conductive metal 902 positioned around the auger shaft in between auger flights 904. The conductive metal may be in a form of a wire, a ribbon, or a rod. In this, design solids will be sufficiently attracted to the anode metal to induce dewatering of the slurry and the swirling motion of the auger will convey the dewatered solids out of the system. Electrochemical reactions associated with the electro-kinetic process may result in an alkaline environment, for instance with a pH of about 10. The conductive metal may be prone to corrosion due to the electro-kinetic reaction, relatively high salinity of tailings water (for instance about 10-15 parts per thousand) and the high pH environment in the system. A series of corrosion resistant metals were tested and titanium Grade 1 coated with TELPRO mixed metal coating, which consists of $IrO_2/Ta_2O_5$, was determined to show near nil corrosion rates in brine media over a pH range of 3 to 11. The superior corrosion resistance of titanium was owing to TELPRO mixed metal coating and the formation of very stable and protective oxide films on the metal surfaces. Since titanium has an extremely high affinity for oxygen, the protective oxide films form almost immediately when fresh metal surfaces are exposed to air and/or moisture. A damaged oxide film can heal itself quickly. These naturally formed films are typically less than 10 nm thick and invisible to the naked eye. The conductive metal can be made in whole or in part of titanium, including a non-titanium core covered with titanium patches or ribbon coated with TELPRO mixed metal coating. Titanium alloys may also be used.

In particular, testing showed that a stainless steel auger exhibited a corrosion rate of 20 mg/min in an electro-kinetic thickener and that a titanium auger exhibited near zero corrosion. The corrosion rate was obtained by weighing the anode ribbon before and after the test.

The size of the auger, the metal around the auger shaft and screen tube as well as the overall design of the system may be based on the amount of tailings to be treated.

Conductive Rod Positioned Lengthwise in the Center of Rotating Shaftless Auger

Figure 10:
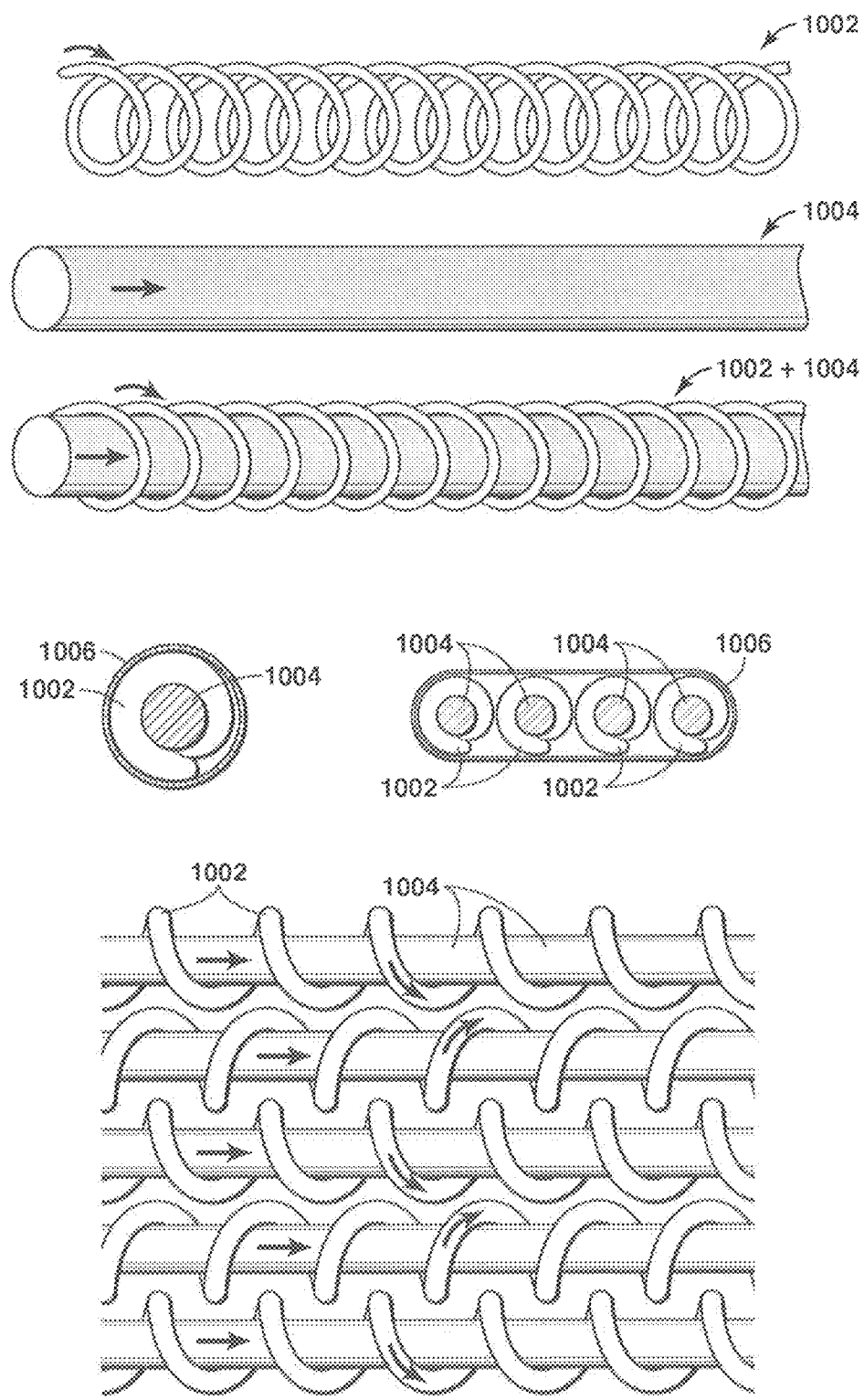
FIG. 10 shows schematics of arrangements of rotating shaftless augers with fixed anode rods positioned in the center of the shaftless augers.

For slurries like FFT with PSD of less than 1 micron to 120 microns and $D_{50}$ of about 70 microns and slurries like MFT with PSD of less than 1 micron to 30 microns and $D_{50}$ of about 7.5 microns, the auger may be (with reference to FIG. 10) shaftless 1002 with an opening along the length of the auger and the anode element may be a conductive rod 1004 positioned in the center of the shaftless auger 1002. Shaftless augers are also known as spiral augers. In this design, solids will be strongly attracted to the conductive rod and the rotating spiral auger will simultaneously scrape the solids off the auger while conveying them out of the system. Similarly, electrochemical reactions associated with the electro-kinetic process may result in an alkaline environment, for instance with a pH of about 10. The conductive rod may be prone to corrosion due to the electro-kinetic reaction, relatively high salinity of tailings water (for instance about 10-15 parts per thousand) and the high pH environment in the system. The rod therefore is made of a corrosion resistant material. The rod may be made of titanium Grade 1 coated with TELPRO mixed metal coating which consists of $IrO_2$/$Ta_2O_5$ and shows little to nil corrosion rates in electro-kinetic reactions. The conductive rod may be made, in whole or in part, of titanium, including a non-titanium core covered with titanium patches or ribbon coated with TELPRO mixed metal coating. Titanium alloys may also be used. In FIG. 10, the screen tube supported with mesh tubes 1006 is also shown.

The size of the shaftless auger, the conductive rod and screen tube as well as the overall design depends on the amount of tailings to be treated. For small amounts of feed, the system may be comprised of one rotating shaftless auger with one conductive rod in the middle and one cylindrical screen tube. For larger amounts, the system may be comprised of multiple rotating shaftless augers placed side by side with each of them having a conductive rod in the middle. One rotating shaftless auger may turn clockwise while the adjacent one may turn counterclockwise to provide additional mixing while conveying and scraping solids off the adjacent augers (refer to FIG. 10, bottom schematic). Additionally, shaftless augers may be made with constant or varying pitches (spacing between the flights). The pitch on the product discharge side of the auger may be narrower than on the feed side in order to increase the amount of water removed from the slurry by providing additional mixing of the slurry as it is further dewatered through the system.

Cathode

Screen Tube Supported by a Mesh Tube

A test was conducted comparing the performance of a sintered tube and a screen tube supported by a mesh tube. The mesh tube was disposed on the outside of the screen.

The test was performed in a 1-inch diameter electro-kinetic thickener. The sample depth between an anode auger and a cathode tube (thickness) was 0.005 m. An average voltage gradient of 4000 V/m was applied across the sample. Tailings with 35% solids entered an electro-kinetic thickener through the feed hopper at the rate of 3,500 to 8,500 $kg/hr/m^2$. A product solid content of 50% and yield stress of 5 KPa was achieved.

The results indicated that the unit with the screen tube can dewater up to 11.5 times faster compared to the one with the sintered tube. The dewatering performance of the electro-kinetic thickener was reported in percent thickened which is defined as follows:

Percent thickened=(product solid %–feed solid %)/feed solid %.

Figure 13:
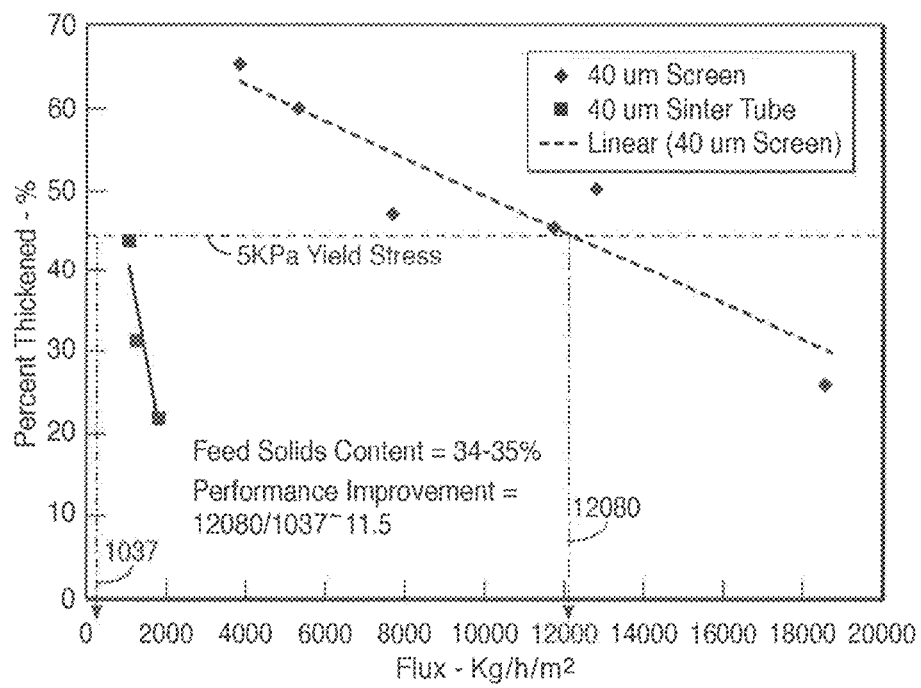
FIG. 13 is graph showing the improved performance of a screen tube supported by a mesh tube as compared to a sintered tube.

FIG. 13 shows that a 5 kPa yield stress was achieved with a 40 μm sintered tube at 1037 $kg/hr/m^2$ when TSRU tailings were thickened from 35% feed solid content to 50% solid content (percent thickened=43%). After replacing the sintered tube with a 40 μm screen tube supported by a mesh tube (pore size=0.0022 inches), the same percent thickened was achieved at 12,080 $kg/hr/m^2$, reducing the residence time of the feed by a factor of 11.5.

Screen Tube Packed Between Two Mesh Tubes

Figure 14:
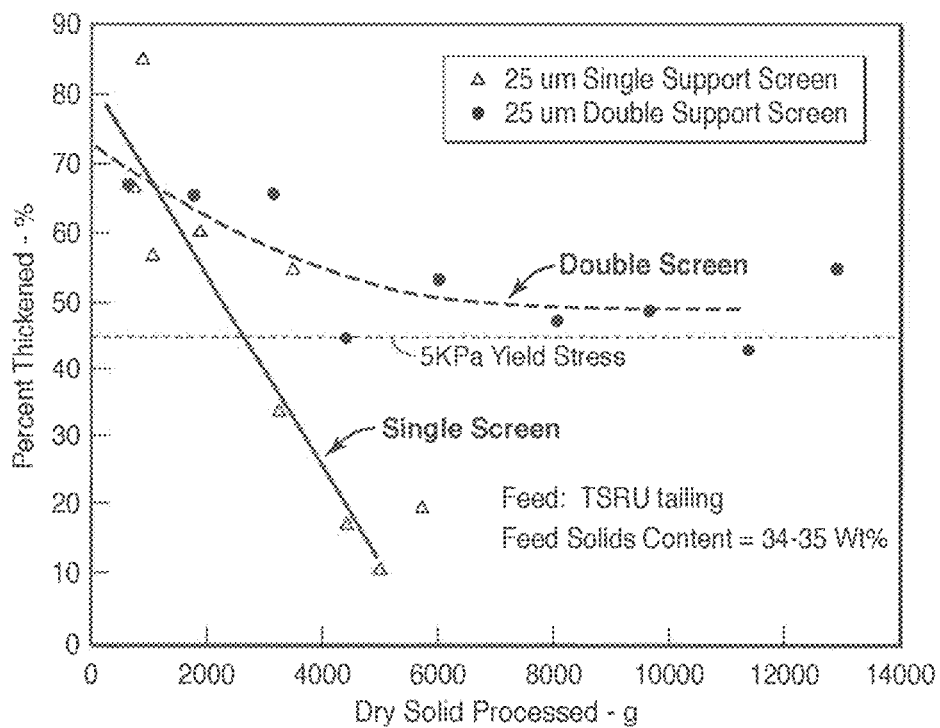
FIG. 14 is a graph showing the improved performance of a screen tube packed between two mesh tubes.

FIGS. 11 and 12 illustrate a singly supported screen tube and a doubly supported screen tube, respectively. A test was conducted for a doubly supported screen tube, i.e. a screen tube packed between two mesh tubes. As shown in FIG. 14, this arrangement maintained its dewatering performance, described as percent thickened (%), and showed no significant indication of fouling. The x-axis in FIG. 14 is the mass of processed dry solid in grams (g). By contrast, in the single support arrangement (i.e. a screen tube supported only on its inside as in FIG. 11), the dewatering performance of the electro-kinetic thickener was negatively impacted due to fouling to the extent that the performance dropped below the 5 kPa yield stress criterion for the dewatered product after processing of 3 kg of solids. Fouling in the single support was hypothesized to be due to the pressure exerted by the auger flights. As a result, the inner mesh tube was added to be in contact with the auger flights to protect the screen tube from fouling.

The size and shape of the screen tube may depend on the size and design of the auger. For a one-auger system, the screen tube may be cylindrical. For a multiple-auger system, the screen tube may be flat with round edges (refer to FIG. 10).

Backwash

If fouling eventually occurs after a long period of operation, e.g. a month, a water backwash system may be used to clean the fouled tube while normal operation is suspended. The backwash cycle may last 3 to 8 minutes. A small portion of separated water from the slurry may be used as backwash fluid. Accordingly, while a singly supported screen tube may be used, a doubly supported screen tube may be preferred. Potential benefits may include mitigating fouling in the thickener and improving dewatering performance. The backwash system may comprise a manifold for distributing low pressure (0-250 psi) or high pressure (250-1500 psi) water through water nozzles. The water is flowed in the opposite direction as the slurry. The nozzles are to rotate around the cathode tube and along its length.

NUMBERED EMBODIMENTS

Embodiment 1

A method of dewatering a slurry, the slurry being tailings from bitumen extraction of mined oil sand, the method comprising:

providing the slurry comprising positively-charged and dissolved cations in water and negatively-charged and suspended particles; and passing the slurry through at least one electro-kinetic thickener having a voltage gradient to remove the positively-charged cations and associated water from the slurry to produce a dewatered slurry.

Embodiment 2

The method of Embodiment 1, wherein the electro-kinetic thickener comprises:

an auger to move the slurry downstream, and having a conductive metal as an anode to attract the negatively-charged slurry particles and to repel the positively-charged cations; and a porous drum, having the auger disposed therein, and being a cathode to repel the negatively-charged slurry particles, attract the positively-charged cations and the associated water, and allow the water to pass through the porous drum by electro-osmosis.

Embodiment 3

The method of Embodiment 2, wherein the auger is static.

Embodiment 4

The method of Embodiment 2, wherein the auger is mobile and is shafted or shaftless.

Embodiment 5

The method of any one of Embodiment 2 to 4, wherein the electro-kinetic thickener further comprises a collection chamber for collecting the water passing through the porous drum.

Embodiment 6

The method of any one of Embodiments 2 to 5, wherein the porous drum comprises a screen tube.

Embodiment 7

The method of Embodiment 6, wherein the screen tube has a nominal sieve opening of between 10 and 40 μm.

Embodiment 8

The method of Embodiment 6, wherein the screen tube has a nominal sieve opening of within 50% of a D20 particle size distribution of particles of the slurry.

Embodiment 9

The method of any one of Embodiments 6 to 8, wherein the screen tube is supported on its outside by a mesh tube.

Embodiment 10

The method of any one of Embodiments 6 to 8, wherein the screen tube is supported on its inside and outside by a mesh tube.

Embodiment 11

The method of Embodiment 9 or 10, wherein the mesh tube has a mesh number of 60 to 400.

Embodiment 12

The method of Embodiment 9 or 10, wherein the mesh tube has apertures of 0.01 to 0.001 inches.

Embodiment 13

The method of any one of Embodiments 2 to 12, further comprising backwashing the thickener by spraying water against the porous drum to remove foulant.

Embodiment 14

The method of any one of Embodiments 1 to 13, wherein the slurry is delivered to the electro-kinetic thickener by pipeline.

Embodiment 15

The method of any one of Embodiments 1 to 14, wherein the slurry is fed into the electro-kinetic thickener using a feed hopper.

Embodiment 16

The method of any one of Embodiments 1 to 14, wherein the anode is in the form of a wire, a ribbon, or a rod.

Embodiment 17

The method of any one of Embodiments 1 to 14, wherein the slurry comprises mature fine tailings.

Embodiment 18

The method of any one of Embodiments 1 to 14, further comprising thickening tailings solvent recovery unit tailings to produce thickened tailings for use as the slurry in the electro-kinetic thickener.

Embodiment 19

The method of any one of Embodiments 1 to 14, further comprising thickening fine flotation tailings to produce thickened tailings for use as the slurry in the electro-kinetic thickener.

Embodiment 20

The method of Embodiment 19, further comprising passing the thickened tailings through a shear-thinning loop using a centrifugal pump to dewater the thickened tailings via pipeline, for use as the slurry in the electro-kinetic thickener.

Embodiment 21

The method of Embodiment 18, wherein the tailings solvent recovery unit tailings stem from a paraffinic froth treatment process.

Embodiment 22

The method of Embodiment 21, wherein the tailings solvent recovery unit tailings comprise inorganic compounds and asphaltenes.

Embodiment 23

The method of Embodiment 22, wherein the inorganic compounds comprise Si, Al, Ti, Ca, Fe, Mg, or more than one of the foregoing.

Embodiment 24

The method of any one of Embodiments 1 to 23, wherein the slurry has a solids content of 10 to 40 wt. %.

Embodiment 25

The method of any one of Embodiments 1 to 24, wherein the dewatered slurry has a yield stress of at least 5 kPa.

Embodiment 26

The method of any one of Embodiments 1 to 24, wherein the voltage gradient is from 2000 V/m to 6000 V/m.

Embodiment 27

An electro-kinetic thickener for dewatering a slurry, the slurry being tailings from bitumen extraction of mined oil sand, the electro-kinetic thickener comprising:
an auger to move the slurry downstream, and having a conductive metal as an anode to attract negatively-charged slurry particles and to repel positively-charged water; and
a porous drum, having the auger disposed therein, and being a cathode to repel the negatively-charged slurry particles, attract the positively-charged cations, and allow the positively-charged cations and associated water to pass through the porous drum by electro-osmosis.

Embodiment 28

The electro-kinetic thickener of Embodiment 27, wherein the auger is static.

Embodiment 29

The electro-kinetic thickener of Embodiment 28, wherein the auger is mobile and is shafted or shaftless.

Embodiment 30

The electro-kinetic thickener of any one of Embodiments 27 to 29, wherein the electro-kinetic thickener further comprises a collection chamber for collecting the water passing through the porous drum.

Embodiment 31

The electro-kinetic thickener of any one of Embodiments 27 to 30, further comprising an electrical field source for supplying a voltage gradient of from 2000 V/m to 6000 V/m.

Embodiment 32

The electro-kinetic thickener of any one of Embodiments 27 to 31, wherein the porous drum comprises a screen tube.

Embodiment 33

The electro-kinetic thickener of Embodiment 32, wherein the screen tube has a nominal sieve opening of between 10 and 40 μm.

Embodiment 34

The electro-kinetic thickener of Embodiment 32 or 33, wherein the screen tube has a nominal sieve opening of within 50% of a D20 particle size distribution of particles of the slurry.

Embodiment 35

The electro-kinetic thickener of any one of Embodiments 32 to 34, wherein the screen tube is supported on its outside by a mesh tube.

Embodiment 36

The electro-kinetic thickener of any one of Embodiments 32 to 34, wherein the screen tube is supported on its inside and outside by a mesh tube.

Embodiment 37

The electro-kinetic thickener of Embodiment 35 or 36, wherein the mesh tube has a mesh number of 60 to 400.

Embodiment 38

The electro-kinetic thickener of Embodiment 35 or 36, wherein the mesh tube has apertures of 0.01 to 0.001 inches.

Embodiment 39

The electro-kinetic thickener of any one of Embodiments 27 to 38, further comprising a backwash system for spraying liquid against the porous drum to remove foulant.

Embodiment 40

The electro-kinetic thickener of Embodiment 39, wherein the backwashing system comprises a manifold and nozzles.

Embodiment 41

The electro-kinetic thickener of any one of Embodiments 27 to 40, wherein an outer surface of the auger is made of titanium or a titanium alloy.

Embodiment 42

The electro-kinetic thickener of any one of Embodiments 27 to 40, wherein the anode is in the form of a wire, a ribbon, or a rod.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of dewatering a slurry, the slurry being tailings from bitumen extraction of mined oil sand, the method comprising:
   providing the slurry comprising mature fine tailings (MFT) or tailings from a tailings solvent recovery unit (TSRU) wherein the slurry comprises positively charged, dissolved cations in water, and negatively charged, suspended particles; and
   passing the slurry through at least one electro-kinetic thickener having a voltage gradient to remove the positively charged and dissolved cations and associated water from the slurry to produce a dewatered slurry, wherein the at least one electro-kinetic thickener comprises:
   an auger to move the slurry downstream, the auger having a conductive metal as an anode to attract the negatively charged and suspended particles and to repel the positively charged and dissolved cations; and
   a porous drum, having the auger disposed therein, and such porous drum being a cathode to repel the negatively charged and suspended particles, attract the positively charged and dissolved cations and the associated water, and allow the associated water to pass through the porous drum by electro-osmosis,
   wherein the porous drum comprises a screen tube, and the screen tube is supported on its outside by a first mesh tube and supported on its inside by a second mesh tube, the screen tube has a nominal sieve opening of one of (i) between 10 and 40 µm and (ii) within 50% of the D20 value of the particle size distribution of particles of the slurry, and
   at least one mesh tube has apertures of 0.01 to 0.001 inches.

2. The method of claim 1, wherein the auger is one of (i) static, (ii) mobile and shafted, and (iii) mobile and shaftless.

3. The method of 1, wherein the at least one electro-kinetic thickener further comprises a collection chamber for collecting the associated water passing through the porous drum.

4. The method of claim 1, further comprising backwashing the thickener by spraying water against the porous drum to remove foulant.

5. The method of claim 1, wherein the anode is in the form of a wire, a ribbon, or a rod.

6. The method of claim 1, wherein the slurry comprises mature fine tailings.

7. The method of claim 1, further comprising thickening tailings solvent recovery unit tailings to produce thickened tailings for use as the slurry in the at least one electro-kinetic thickener.

8. The method of claim 1, further comprising thickening fine flotation tailings to produce thickened tailings for use as the slurry in the at least one electro-kinetic thickener.

9. The method of claim 8, further comprising passing the thickened tailings through a shear-thinning loop using a centrifugal pump to dewater the thickened tailings for use as the slurry in the at least one electro-kinetic thickener.

10. The method of claim 7, wherein the tailings solvent recovery unit tailings stem from a paraffinic froth treatment process.

11. The method of claim 1, wherein the slurry has a solids content of 10 to 40 wt. %.

12. The method of claim 1, wherein the dewatered slurry has a yield stress of at least 5 kPa.

13. The method of claim 1, wherein the voltage gradient is from 2000 V/m to 6000 V/m.

14. The method of claim 1, wherein the auger comprises a first auger and a second auger adjacent to the first auger, wherein the first and second augers are both either shafted or shaftless, wherein the first auger rotates clockwise and the second auger rotates counterclockwise, and both augers contain the conductive metal as the anode.

* * * * *